(12) United States Patent
Crothers

(10) Patent No.: US 10,792,885 B2
(45) Date of Patent: Oct. 6, 2020

(54) THERMOPLASTIC ASSEMBLIES, METHODS OF DEFINING THERMOPLASTIC ASSEMBLIES, AND AIRCRAFT INCLUDING THE THERMOPLASTIC ASSEMBLIES AND/OR MANUFACTURED UTILIZING THE METHODS

(71) Applicant: The Boeing Company, Chicago, IL (US)

(72) Inventor: Phillip John Crothers, Hampton East (AU)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/160,787

(22) Filed: Oct. 15, 2018

(65) Prior Publication Data
US 2020/0114615 A1 Apr. 16, 2020

(51) Int. Cl.
| | |
|---|---|
| *B29C 65/00* | (2006.01) |
| *B29C 65/34* | (2006.01) |
| *B29C 65/36* | (2006.01) |
| *B29C 65/48* | (2006.01) |

(Continued)

(52) U.S. Cl.
CPC .............. *B32B 3/263* (2013.01); *B32B 27/08* (2013.01); *B32B 37/182* (2013.01);
(Continued)

(58) Field of Classification Search
CPC ......... B29C 65/00; B29C 65/02; B29C 65/14; B29C 65/1435; B29C 65/34; B29C 65/3444; B29C 65/3456; B29C 65/3472; B29C 65/36; B29C 65/3676; B29C 65/48; B29C 65/4815; B29C 66/00; B29C 66/30321; B29C 66/365; B29C 66/56;
(Continued)

(56) References Cited

U.S. PATENT DOCUMENTS

| | | | | |
|---|---|---|---|---|
| 4,865,674 | A | * | 9/1989 | Durkin ................. B29C 37/0082 156/158 |
| 5,756,973 | A | * | 5/1998 | Kirkwood ............... B29C 65/34 219/634 |

(Continued)

FOREIGN PATENT DOCUMENTS

| | | | | |
|---|---|---|---|---|
| EP | 0128837 | A1 * | 12/1984 | .............. B60J 10/70 |
| FR | 2742691 | A1 * | 6/1997 | ........... B29C 66/131 |

*Primary Examiner* — Philip C Tucker
*Assistant Examiner* — Brian R Slawski
(74) *Attorney, Agent, or Firm* — Dascenzo Intellectual Property Law, P.C.

(57) ABSTRACT

Thermoplastic assemblies, methods of defining thermoplastic assemblies, aircraft that include the thermoplastic assemblies, and aircraft that are formed utilizing the methods are disclosed herein. The methods include heating a joining structure and pressing a thermoplastic layer against a base of the joining structure. The pressing includes transferring thermal energy from the joining structure to the thermoplastic layer and penetrating the thermoplastic layer with a plurality of reinforcing projections of the joining structure. The pressing also includes adhering the thermoplastic layer to a surface of the base and to a surface of the plurality of reinforcing projections. The thermoplastic assemblies include the thermoplastic layer and the joining structure.

16 Claims, 7 Drawing Sheets

(51) Int. Cl.
  *B29C 65/44* (2006.01)
  *B32B 37/00* (2006.01)
  *B32B 7/08* (2019.01)
  *B32B 27/08* (2006.01)
  *B32B 37/04* (2006.01)
  *B32B 37/06* (2006.01)
  *B32B 3/26* (2006.01)
  *B32B 37/18* (2006.01)

(52) U.S. Cl.
  CPC ...... *B29C 65/3444* (2013.01); *B29C 65/3456* (2013.01); *B29C 65/36* (2013.01); *B29C 65/44* (2013.01); *B29C 65/4815* (2013.01); *B29C 66/30321* (2013.01); *B29C 66/73921* (2013.01); *B32B 7/08* (2013.01); *B32B 37/06* (2013.01); *B32B 2605/18* (2013.01)

(58) Field of Classification Search
  CPC . B29C 66/562; B29C 66/564; B29C 66/1122; B29C 66/73921; B29C 66/7392; B29C 65/44; B29C 65/46; Y02T 50/43; B32B 27/08; B32B 7/08; B32B 37/06; B32B 27/06; B32B 7/04; B32B 37/04; B29L 2031/3076
  USPC .......... 156/60, 91, 92, 250, 252, 253, 272.2, 156/272.4, 273.7, 275.7, 297, 299, 308.2, 156/309.6, 321, 324.4; 219/633, 634; 285/21.2; 403/270
  See application file for complete search history.

(56) References Cited

U.S. PATENT DOCUMENTS

| | | | |
|---|---|---|---|
| 5,863,635 A | | 1/1999 | Childress |
| 5,868,886 A | | 2/1999 | Alston et al. |
| 6,436,507 B1 | | 8/2002 | Pannell |
| 9,336,588 B2 | | 5/2016 | Crothers et al. |
| 9,604,403 B1 | | 3/2017 | Wilenski et al. |
| 2013/0149501 A1 | * | 6/2013 | Pacchione ......... B29C 66/73751 428/172 |
| 2013/0287481 A1 | * | 10/2013 | Hardy ................ C09J 5/06 403/270 |
| 2016/0039157 A1 | * | 2/2016 | Huang ................ B29C 65/3684 156/94 |
| 2016/0318292 A1 | * | 11/2016 | Jurgens .................. B32B 18/00 |

* cited by examiner

THERMOPLASTIC ASSEMBLIES, METHODS OF DEFINING THERMOPLASTIC ASSEMBLIES, AND AIRCRAFT INCLUDING THE THERMOPLASTIC ASSEMBLIES AND/OR MANUFACTURED UTILIZING THE METHODS

FIELD

Thermoplastic assemblies, methods of defining thermoplastic assemblies, aircraft that include the thermoplastic assemblies, and/or aircraft that are formed utilizing the methods.

BACKGROUND

Thermoplastics are polymeric materials that may become pliable above a specified temperature and that harden upon cooling. In many manufacturing processes, two thermoplastic sub-assemblies may be formed and subsequently joined together via a process that may be referred to herein as thermoplastic bonding. Thermoplastic bonding may include heating a bonding region of each of the two thermoplastic sub-assemblies and pressing the bonding regions of the two thermoplastic sub-assemblies together to form an adhesive, a comingled, and/or a cohesive bond within an interface region that extends between the two thermoplastic sub-assemblies. This bond may be defined via co-melting of the two thermoplastic sub-assemblies within the interface region, which may intermingle and/or entangle polymeric molecules from one thermoplastic sub-assembly with polymeric molecules from the other thermoplastic sub-assembly. Such thermoplastic bonding may be relatively fast, efficient, and/or cost-effective when compared to joining techniques that may utilize fasteners to join two sub-assemblies together. Thus, significant cost and/or time-savings often may be realized by utilizing thermoplastic bonding.

While conventional thermoplastic bonding techniques may be suitable for certain applications, they exhibit several limitations. These limitations include a relatively small bonding area (i.e., within the interface region between the two thermoplastic sub-assemblies), limitations on bond strength between the two thermoplastic sub-assemblies, variations in bond strength with direction, difficulty in applying heat directly to the interface region, and/or the inability to arrest cracks that may form within the interface region.

The above-described limitations may make conventional thermoplastic bonding techniques unsuitable for certain applications, such as within the aerospace industries and/or in aircraft manufacturing. Thus, there exists a need for improved thermoplastic assemblies, for improved methods of defining thermoplastic assemblies, and/or for aircraft that include the improved thermoplastic assemblies and/or that are manufactured utilizing the improved methods.

SUMMARY

Thermoplastic assemblies, methods of defining thermoplastic assemblies, aircraft that include the thermoplastic assemblies, and aircraft that are formed utilizing the methods are disclosed herein. The methods include heating a joining structure and pressing a thermoplastic layer against a base of the joining structure. The pressing includes transferring thermal energy from the joining structure to the thermoplastic layer and penetrating the thermoplastic layer with a plurality of reinforcing projections of the joining structure. The pressing also includes adhering the thermoplastic layer to a surface of the base and to a surface of the plurality of reinforcing projections. The adhering includes adhering with a melt region of the thermoplastic layer that is formed responsive to the transferring, and the adhering also includes cooling the thermoplastic layer and the joining structure to solidify the melt region and define the thermoplastic assembly.

The thermoplastic assemblies include the thermoplastic layer and the joining structure. The joining structure includes the base and the plurality of reinforcing projections. The plurality of reinforcing projections extends into the thermoplastic layer and the thermoplastic layer is in direct physical contact with the base. The melt region of the thermoplastic layer adheres the thermoplastic layer to the surface of the base and also to the surface of the plurality of reinforcing projections.

DESCRIPTION

Figure 1:
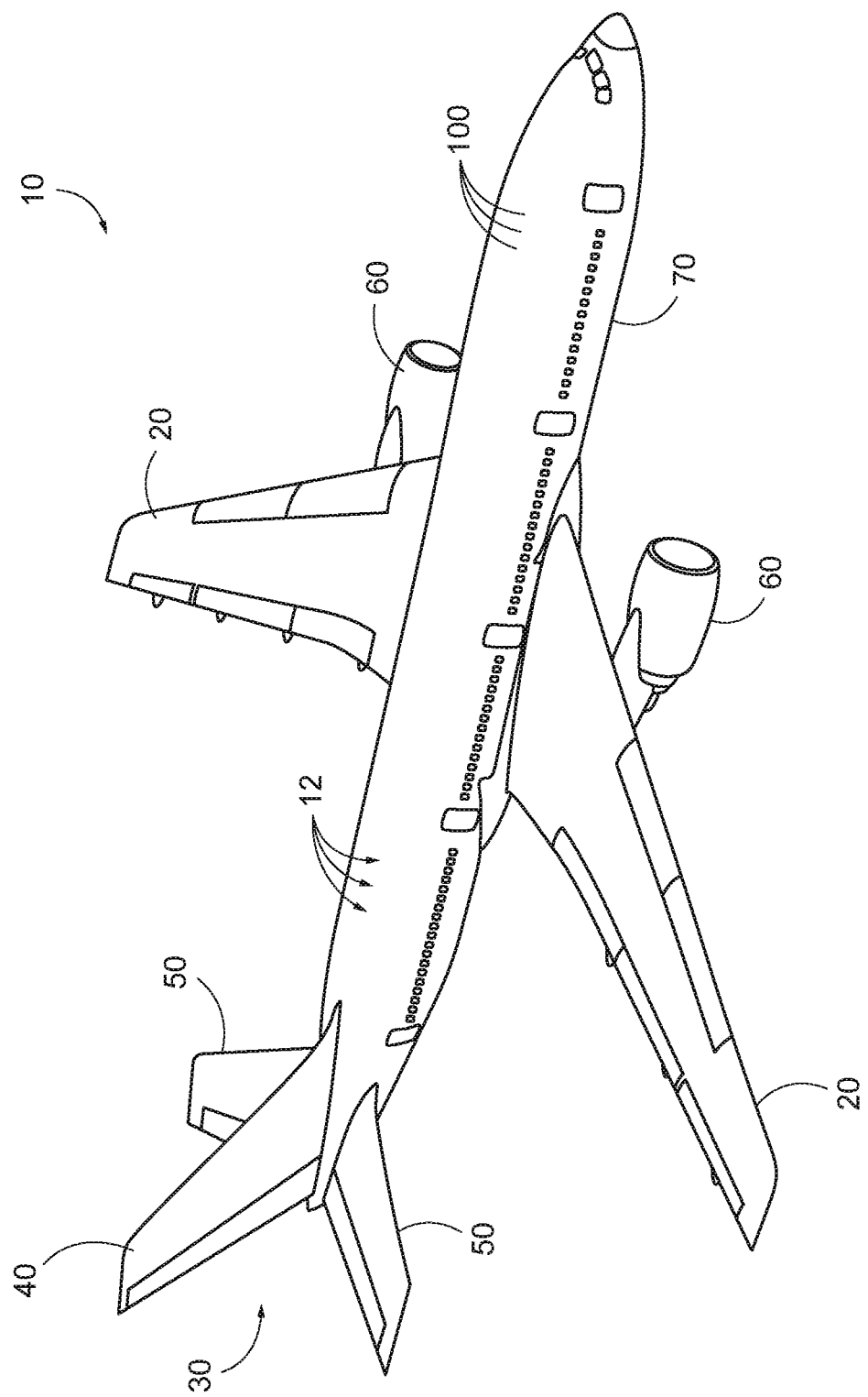
FIG. 1 is an illustration of an aircraft that may include thermoplastic assemblies and/or that may be manufactured utilizing the methods according to the present disclosure.

FIGS. 1-12 provide illustrative, non-exclusive examples of thermoplastic assemblies 100, of methods 200 of defining thermoplastic assemblies 100, of aircraft 10 that include thermoplastic assemblies 100, and/or of aircraft 10 manufactured utilizing methods 200, according to the present disclosure. Elements that serve a similar, or at least substantially similar, purpose are labeled with like numbers in each of FIGS. 1-12, and these elements may not be discussed in detail herein with reference to each of FIGS. 1-12. Similarly, all elements may not be labeled in each of FIGS. 1-12, but reference numerals associated therewith may be utilized herein for consistency. Elements, components, and/or features that are discussed herein with reference to one or more of FIGS. 1-12 may be included in and/or utilized with any of FIGS. 1-12 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is an illustration of an aircraft 10 that may include thermoplastic assemblies 100 and/or that may be manufactured utilizing methods 200 according to the present disclosure. Aircraft 10 may include and/or may formed and/or manufactured from a plurality of components, or sub-assemblies, 12; and at least a fraction of these components 12 may include a thermoplastic assembly 100, according to the present disclosure. As examples, aircraft 10 may include sub-assemblies 12 in the form of wings 20, a tail assembly 30, a vertical stabilizer 40, horizontal stabilizers 50, engines 60, and/or a fuselage 70. It is within the scope of the present disclosure that one or more sub-assembly 12 of aircraft 10 may include a thermoplastic assembly 100 and/or may be manufactured utilizing methods 200. Additionally or alternatively, two or more sub-assemblies 12 of aircraft 10 may be operatively attached to one another utilizing a thermoplastic assembly 100 and/or utilizing methods 200.

Figure 2:
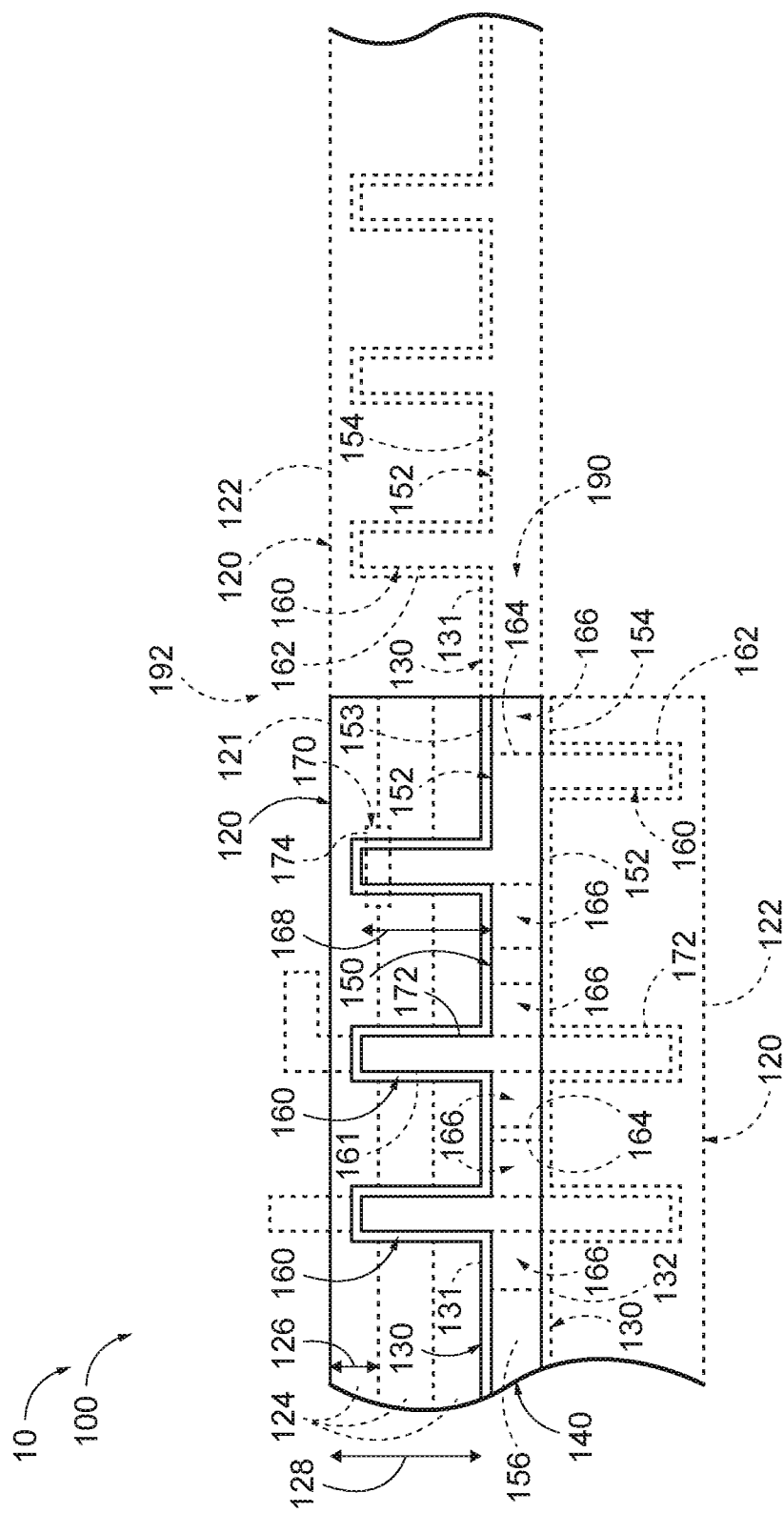
FIG. 2 is a schematic illustration of examples of thermoplastic assemblies according to the present disclosure.
Figure 3:
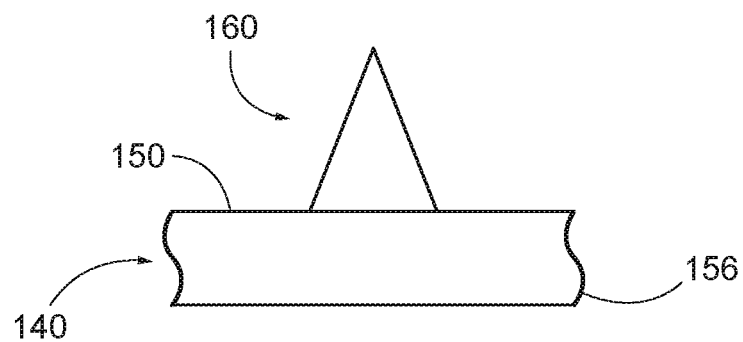
FIG. 3 is a schematic illustration of a side view of an example of a portion of a joining structure according to the present disclosure.

FIG. 2 is a schematic illustration of examples of thermoplastic assemblies 100 according to the present disclosure. As illustrated in solid lines in FIG. 2, thermoplastic assemblies 100 include a thermoplastic layer 120, which also may be referred to herein as a thermoplastic sub-assembly 120, and a joining structure 140. Joining structure 140 includes a base 150 and a plurality of reinforcing projections 160. Reinforcing projections 160 extend into thermoplastic layer 120, and thermoplastic layer 120 is in contact, in direct contact, and/or in direct physical contact with joining structure 140, with base 150, and/or with reinforcing projections 160. In addition, a melt region 130 of thermoplastic layer 120 adheres the thermoplastic layer to a surface, to an exposed surface, and/or to an external surface 152 of base 150 and also to a surface, to an exposed surface, and/or to an external surface 172 of reinforcing projections 160.

As used herein, the phrase "melt region" may refer to a region of thermoplastic layer 120 that is, or that is currently, melted. Additionally or alternatively, the phrase "melt region" also may refer to a region of thermoplastic layer 120 that was melted during formation of thermoplastic assemblies 100 and that subsequently was solidified to form and/or define the thermoplastic assemblies.

As illustrated in dashed lines in FIG. 2, thermoplastic layer 120 may include and/or be a first thermoplastic layer 121, which also may be referred to herein as a first thermoplastic sub-assembly 121; and thermoplastic assemblies 100 also may include a second thermoplastic layer 122, which also may be referred to herein as a second thermoplastic sub-assembly 122. In addition, surface 152 of base 150 may be a first surface 153 of the base, which may be defined within a first region of the base, and joining structure 140 also may include a second surface 154 of base 150, which may be defined within a second region of the base. Similarly, the plurality of reinforcing projections 160 may be a first plurality of reinforcing projections 161, which may project from first surface 153, and joining structure 140 also may include a second plurality of reinforcing projections 162, which may project from second surface 154 and/or may extend into second thermoplastic layer 122. Furthermore, melt region 130 may be a first melt region 131 and second thermoplastic layer 122 may include a second melt region 132. Under these conditions, second thermoplastic layer 122 may be in contact, may be in direct contact, and/or may be in direct physical contact with second surface 154 of base 150. In addition, second melt region 132 of second thermoplastic layer 122 may adhere the second thermoplastic layer to second surface 154 of base 150 and also to surface 172 of second plurality of reinforcing projections 162.

It is within the scope of the present disclosure that thermoplastic assembly 100 may join first thermoplastic layer 121 and second thermoplastic layer 122 in any suitable manner that includes and/or utilizes joining structure 140. As an example, and as indicated at 190, thermoplastic assembly 100 may define a lap joint between first thermoplastic layer 121 and second thermoplastic layer 122. Under these conditions, first surface 153 and second surface 154 of base 150 may face away from one another, may be opposite one another, may face in opposed directions, and/or may be on opposed sides of joining structure 140. As another example, and as indicated at 192, thermoplastic assembly 100 may define a butt joint between first thermoplastic layer 121 and second thermoplastic layer 122. Under these conditions, first surface 153 and second surface 154 of base 150 may be on the same side of joining structure 140 and/or may face in the same direction.

As discussed, it is conventional to bond, or to directly bond, two thermoplastic sub-assemblies together. As also discussed, such bonding may produce a bond with a limited bond area, with a limited bond strength, with variation in bond strength with direction, and/or with an inability to arrest, halt, stop, and/or mitigate crack propagation therein. Thermoplastic assemblies 100 that include joining structure 140, according to the present disclosure, may overcome these limitations, such as by providing out-of-plane reinforcement to the bond between the two thermoplastic sub-assemblies.

As an example, bond strength may be increased by the presence of an increased surface area for bonding (i.e., surface 152 of base 150 and surface 172 of reinforcing projections 160) when compared to conventional thermoplastic bonding techniques. As another example, the fact that reinforcing projections 160 extend into both first thermoplastic layer 121 and second thermoplastic layer 122 may physically resist separation of the various components of thermoplastic assemblies 100, may provide significant reinforcement of thermoplastic assemblies 100, and/or may provide additional out-of-plane reinforcement of thermoplastic assemblies 100 when compared to conventional thermoplastic bonding techniques. As yet another example, joining structure 140 may arrest cracks that might develop within thermoplastic assemblies 100, thereby providing improved reliability and/or service life when compared to conventional thermoplastic bonding techniques. As another example, and as discussed in more detail herein with reference to methods 200, joining structure 140 may be utilized to apply, or to directly apply, heat to the interface layer between first thermoplastic layer 121 and second thermoplastic layer 122. As yet another example, joining structure 140 may act as a physical barrier between first thermoplastic layer 121 and second thermoplastic layer 122, thereby permitting physical joining of otherwise incompatible thermoplastic materials.

Thermoplastic layers 120, including first thermoplastic layer 121 and/or second thermoplastic layer 122, may include and/or be any suitable thermoplastic and/or thermoplastic material. As examples, thermoplastic layers 120 may include and/or be a thermoplastic resin and/or a thermoplastic composite. When thermoplastic layers 120 include the thermoplastic composite, the thermoplastic layers may include the thermoplastic resin and a plurality of reinforcing fibers. The plurality of reinforcing fibers may be arranged, within the thermoplastic layers, in any suitable manner. As an example, the thermoplastic layers may include a plurality of plies of thermoplastic material, with each ply including the thermoplastic resin and at least one layer of reinforcing fibers. As another example, the plurality of reinforcing fibers may form a 3-dimensional network that may be randomly and/or systematically arranged. As another example, the plurality of reinforcing fibers may include a plurality of chopped fibers. As additional examples, the plurality of reinforcing fibers, the plurality of plies of thermoplastic material, and/or thermoplastic layers 120 may be formed via a resin infusion process, an additive molding process, and/or an injection molding process. Examples of the reinforcing fibers include glass reinforcing fibers and/or carbon reinforcing fibers.

Additional examples of thermoplastic layers 120 and/or of the thermoplastic resin include one or more of an acrylic, a poly methyl methacrylate (PMMA) polymer, an acrylonitrile butadiene styrene (ABS) polymer, a nylon, a polyamide, a polylactic acid polymer, a polybenzimidazole (PB) polymer, a polycarbonate (PC), a polyether sulfone (PES) polymer, a polyoxymethylene (POM) polymer, a polyetherether ketone (PEEK) polymer, a polyetherimide (PEI) polymer, a polyethylene (PE) polymer, a polyphenylene oxide (PPO) polymer, a polyphynylene sulfide (PPS) polymer, a polypropylene (PP) polymer, a polystyrene polymer, a polyvinyl chloride (PVC) polymer, and/or a polytetrafluoroethylene (PTFE) polymer. As an additional example, thermoplastic layers 120 may be, or may be referred to herein as being electrically insulating thermoplastic layers and/or thermally insulating thermoplastic layers.

Thermoplastic layers 120 and/or thermoplastic materials thereof may have and/or define any suitable thermoplastic material thermal conductivity. Examples of the thermoplastic material thermal conductivity include thermal conductivities of at least 10 Watts/meter-Kelvin (W/m-K), at least 8 W/m-K, at least 6 W/m-K, at least 5 W/m-K, at least 4 W/m-K, at least 3 W/m-K, at least 2 W/m-K, at least 1 W/m-K, at least 0.8 W/m-K, at least 0.6 W/m-K, at least 0.4 W/m-K, at least 0.2 W/m-K, at least 0.1 W/m-K, at most 10 W/m-K, at most 8 W/m-K, at most 6 W/m-K, at most 5 W/m-K, at most 4 W/m-K, at most 3 W/m-K, at most 2 W/m-K, at most 1 W/m-K, at most 0.8 W/m-K, at most 0.6 W/m-K, at most 0.4 W/m-K, at most 0.2 W/m-K, and/or at most 0.1 W/m-K.

Thermoplastic layers 120 and/or thermoplastic materials thereof additionally or alternatively may have and/or define any suitable thermoplastic material heat capacity. Examples of the thermoplastic material heat capacity include heat capacities of at least 500 Joules/kilogram-Kelvin (J/kg-K), at least 600 J/kg-K, at least 700 J/kg-K, at least 800 J/kg-K, at least 900 J/kg-K, at least 1000 J/kg-K, at least 1200 J/kg-K, at least 1400 J/kg-K, at least 1600 J/kg-K, at least 1800 J/kg-K, at least 2000 J/kg-K, at most 500 J/kg-K, at most 600 J/kg-K, at most 700 J/kg-K, at most 800 J/kg-K, at most 900 J/kg-K, at most 1000 J/kg-K, at most 1200 J/kg-K, at most 1400 J/kg-K, at most 1600 J/kg-K, at most 1800 J/kg-K, and/or at most 2000 J/kg-K.

Joining structure 140 may include any suitable structure that includes and/or defines base 150 and the plurality of reinforcing projections 160. It is within the scope of the present disclosure that joining structure 140 may include and/or be a unitary and/or monolithic structure that defines both base 150 and the plurality of reinforcing projections 160. As an example, and as discussed in more detail herein, joining structure 140 may include a sheet of joining material 156 that may be shaped, formed, machined, and/or cut to form and/or define both base 150 and the plurality of reinforcing projections 160.

It is also within the scope of the present disclosure that joining structure 140 may include and/or be an assembly of two or more joining structure components. As an example, the plurality of reinforcing projections 160 may be operatively attached to, welded to, brazed to, and/or fastened to base 150 to form and/or define joining structure 140.

Joining structure 140 may include and/or may be formed from any suitable material and/or materials. As examples, joining structure 140 may include and/or be a thermally conductive joining structure, an electrically conductive joining structure, a metallic joining structure, an aluminum joining structure, a stainless steel joining structure, a titanium joining structure, a non-metallic joining structure, a polymeric joining structure, and/or a metallically loaded polymeric joining structure. As another example, joining structure 140 may be formed from a susceptor material that absorbs electromagnetic radiation and converts the absorbed electromagnetic radiation into heat. Such susceptor materials may be formulated and/or engineered to plateau at a threshold temperature responsive to absorption of electromagnetic radiation, thereby providing an additional mechanism via which thermal energy transfer from joining structure 140 to thermoplastic layers 120 may be regulated and/or controlled during assembly of thermoplastic assemblies 100.

Joining structure 140 may have and/or define any suitable joining structure thermal conductivity. Examples of the joining structure thermal conductivity include thermal conductivities of at least 10 W/m-K, at least 20 W/m-K, at least 30 W/m-K, at least 40 W/m-K, at least 50 W/m-K, at least 60 W/m-K, at least 80 W/m-K, at least 100 W/m-K, at least 125 W/m-K, at least 150 W/m-K, at least 175 W/m-K, at least 200 W/m-K, at least 250 W/m-K, at least 300 W/m-K, at most 10 W/m-K, at most 20 W/m-K, at most 30 W/m-K, at most 40 W/m-K, at most 50 W/m-K, at most 60 W/m-K, at most 80 W/m-K, at most 100 W/m-K, at most 125 W/m-K, at most 150 W/m-K, at most 175 W/m-K, at most 200 W/m-K, at most 250 W/m-K, and/or at most 300 W/m-K.

It is within the scope of the present disclosure that the joining structure thermal conductivity may be greater than the thermoplastic material thermal conductivity. As examples, a ratio of the joining structure thermal conductivity to the thermoplastic material thermal conductivity may be at least 2, at least 4, at least 6, at least 8, at least 10, at least 15, at least 20, at least 30, at least 40, at least 50, at least 75, at least 100, at least 250, at least 500, or at least 1000.

Joining structure 140 additionally or alternatively may have and/or define any suitable joining structure heat capacity. Examples of the joining structure heat capacity include heat capacities of at least 100 J/kg-K, at least 150 J/kg-K, at least 200 J/kg-K, at least 250 J/kg-K, at least 300 J/kg-K, at least 350 J/kg-K, at least 400 J/kg-K, at least 450 J/kg-K, at least 500 J/kg-K, at least 600 J/kg-K, at least 700 J/kg-K, at least 800 J/kg-K, at least 900 J/kg-K, at most 100 J/kg-K, at most 150 J/kg-K, at most 200 J/kg-K, at most 250 J/kg-K, at most 300 J/kg-K, at most 350 J/kg-K, at most 400 J/kg-K, at most 450 J/kg-K, at most 500 J/kg-K, at most 600 J/kg-K, at most 700 J/kg-K, at most 800 J/kg-K, and/or at most 900 J/kg-K.

As discussed, thermoplastic assemblies 100 may be configured such that thermoplastic layers 120 and joining structure 140 are in contact, are in direct contact, and/or are in direct physical contact with one another. With this in mind, joining structure 140 may be non-reactive, or at least substantially non-reactive, with thermoplastic layers 120 and/or may be approved for contact (such as via applicable industry standards) with thermoplastic layers 120. Stated another way, joining structure 140 may not react with, may not degrade, and/or may not contaminate thermoplastic layers 120 before, during, and/or after assembly of thermoplastic layers 120 and joining structure 140 to form and/or define thermoplastic assemblies 100.

Reinforcing projections 160 may have any suitable shape and/or geometry. As an example, reinforcing projections 160 may be shaped to resist deformation, not to deform, not to plastically deform, and/or not to bend during formation of thermoplastic assemblies 100 that include the reinforcing projections. As a more specific example, and as discussed in more detail herein with reference to methods 200 of FIG. 6, assembly of thermoplastic assemblies 100 may include insertion of reinforcing projections 160 into and/or through at least a region of thermoplastic layers 120. Under these conditions, the reinforcing projections may be shaped to resist deformation, not to deform, not to plastically deform, and/or not to bend during insertion of the reinforcing projections into and/or through the thermoplastic layers.

Examples of a shape, a geometry, and/or a configuration of reinforcing projections 160 include reinforcing projections that are pointed, are triangle-shaped, are arrow-shaped, are teardrop-shaped, are barbed, are pin-shaped, and/or are rod-shaped. Reinforcing projections that are pointed and/or that are at least partially triangle-shaped are illustrated schematically in FIGS. 3-5, while a reinforcing projection that is arrow-shaped and/or that is barbed is illustrated schematically in FIGS. 4-5. As illustrated in FIGS. 2-5, reinforcing projections 160 may project perpendicular, or at least substantially perpendicular, to a respective adjacent region of base 150 and/or of base surface 152 (as illustrated in FIG. 2) thereof. Additionally or alternatively, reinforcing projections 160 may project at a skew angle relative to base 150 and/or base surface 152. In general, an angle at which reinforcing projections 160 extend from base 150 and/or from base surface 152 may correspond to an angle at which thermoplastic layers 120 are pressed against joining structure 140 to define thermoplastic assemblies 100, as discussed in more detail herein.

Figure 4:
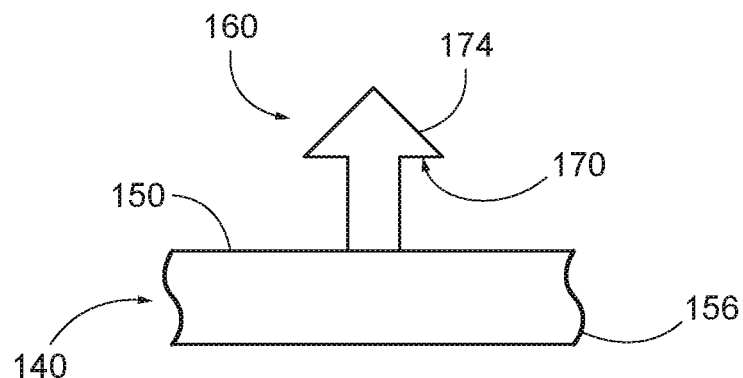
FIG. 4 is a schematic illustration of a side view of an example of a portion of a joining structure according to the present disclosure.

As illustrated in dashed lines in FIG. 2 and in solid lines in FIG. 4, reinforcing projections 160 may include and/or define a separation-resisting region 170. Separation-resisting region 170, when present, may be configured to resist separation of thermoplastic layers 120 from joining structure 140. Separation-resisting region 170 may resist this separation in any suitable manner. As an example, separation-resisting region 170 may include a separation-resisting projection 174 that may project from a remainder of a corresponding reinforcing projection 160. Additionally or alternatively, separation-resisting projection 174 may project parallel, or at least substantially parallel, to a respective region of base 150 from which the corresponding reinforcing projection 160 extends and/or projects.

Figure 5:
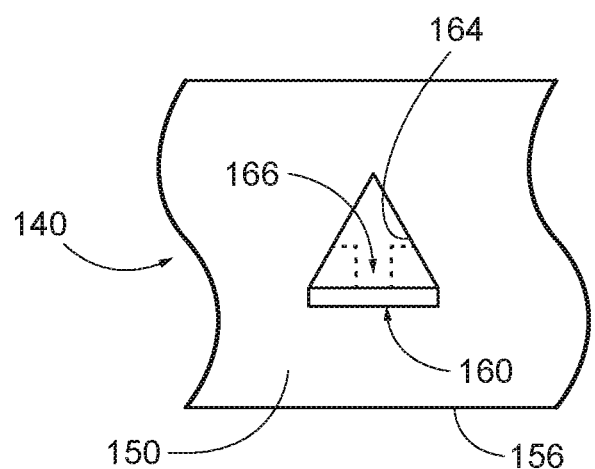
FIG. 5 is a schematic illustration of a top view of the joining structures of FIGS. 3-4.

As discussed, joining structure 140 may be defined by sheet of joining material 156. Sheet of joining material 156 also may be referred to herein as a layer of joining material 156 and/or as a 2-dimensional layer of joining material 156 that has and/or defines a finite joining material thickness. Under these conditions, and as illustrated in FIGS. 2 and 5, sheet of joining material 156 may include a plurality of projection profiles 164 that may be defined therein, such as via machining, milling, etching, stamping, laser cutting, die-cutting, and/or otherwise cutting the sheet of joining material. As perhaps best illustrated by FIGS. 3-5, projection profiles 164 may be at least partially bounded by reinforcing projections 160 and may permit and/or facilitate deformation of sheet of joining material 156 such that reinforcing projections 160 extend out-of-plane with a remainder of the sheet of joining material.

Stated another way, and as illustrated in FIGS. 2 and 5, projection profiles 164 may be formed within sheet of joining material 156 such that the sheet of joining material subsequently may be bent and/or otherwise formed, thereby defining reinforcing projections 160 and/or permitting the reinforcing projections to extend from base 150. With this in mind, joining structure 140 also may include a plurality of holes 166, with each hole 166 being adjacent to, associated with, and/or at least partially bounded by a corresponding reinforcing projection 160. Stated another way, holes 166 may be formed, defined, and/or enlarged when reinforcing projections 160 are bent out-of-plane with base 150 and/or such that the reinforcing projections project from the base.

Reinforcing projections 160 may have and/or define any suitable length, average length, projection length, or average projection length 168, as illustrated in FIG. 2. Projection length 168 may be constant, or at least substantially constant, for all reinforcing projections 160. Alternatively, projection length 168 may vary among reinforcing projections 160.

Similarly, thermoplastic layer 120 may have and/or define any suitable thermoplastic layer thickness, or average thermoplastic layer thickness, 128. The average projection length and/or the average thermoplastic layer thickness may be defined in a direction that is perpendicular to surface 152 of base 150. Examples of a ratio of the average projection length to the average thermoplastic layer thickness include ratios of at least 0.1, at least 0.2, at least 0.3, at least 0.4, at least 0.5, at least 0.6, at least 0.7, at least 0.8, at least 0.9, at least 1.0, at least 1.1, at least 1.2, at least 1.4, at most 2.0, at most 1.8, at most 1.6, at most 1.4, at most 1.2, at most 1.0, at most 0.9, at most 0.8, at most 0.7, at most 0.6, at most 0.5, at most 0.4, at most 0.3, and/or at most 0.2.

In one example, the average projection length may be less than the average thermoplastic layer thickness. Under these conditions, and as illustrated in solid lines in FIG. 2, reinforcing projections 160 may be encapsulated within thermoplastic layer 120.

In another example, the average projection length may be greater than the average thermoplastic layer thickness. Under these conditions, reinforcing projections 160 may extend past and/or project from thermoplastic layer 120, as illustrated in dash-dot lines in FIG. 2. When reinforcing projections 160 extend and/or past and/or project from thermoplastic layer 120, the reinforcing projections may be bent and/or folded against an outer surface of the thermoplastic layer, as also illustrated in dash-dot lines in FIG. 2.

In yet another example, thermoplastic layer 120 may include a plurality of plies 124 of thermoplastic material that may define an average ply thickness 126. Plies 124 may be arranged in a layered, laminated, and/or lamellae structure, as illustrated in FIG. 2. Under these conditions, a ratio of the average projection length to the average ply thickness may be at least 1, at least 2, at least 3, at least 4, at least 5, at least 6, at least 8, at least 10, at most 50, at most 40, at most 30, at most 25, at most 20, at most 15, and/or at most 10. Stated another way, reinforcing projections 160 may extend through at least one ply 124 of thermoplastic material, when present.

Figure 6:
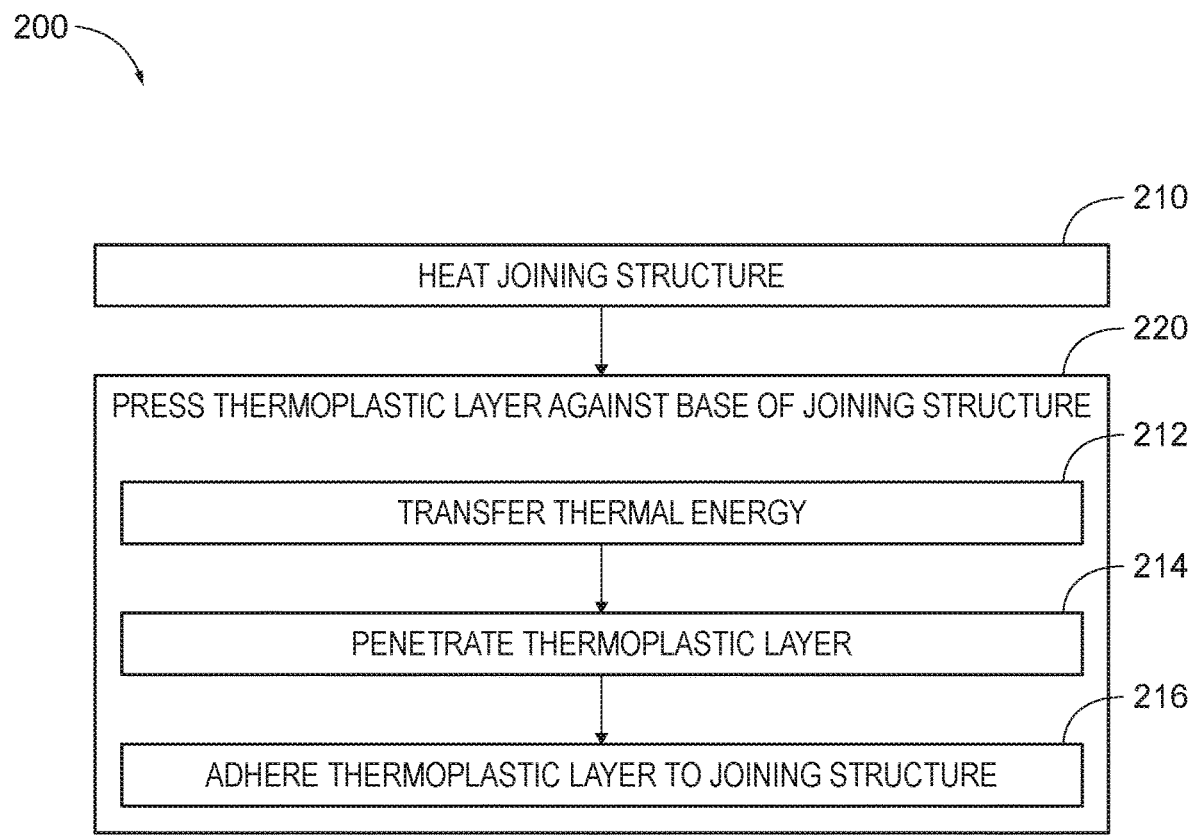
FIG. 6 is a flowchart depicting methods, according to the present disclosure, of adhering a thermoplastic layer to a joining structure to define a thermoplastic assembly.

FIG. 6 is a flowchart depicting methods 200, according to the present disclosure, of adhering a thermoplastic layer to a joining structure to define a thermoplastic assembly. FIGS. 7-10 are illustrations of examples of portions of the method of FIG. 6. Methods 200 include heating the joining structure at 210 and pressing the thermoplastic layer against a base of the joining structure at 220.

Figure 7:
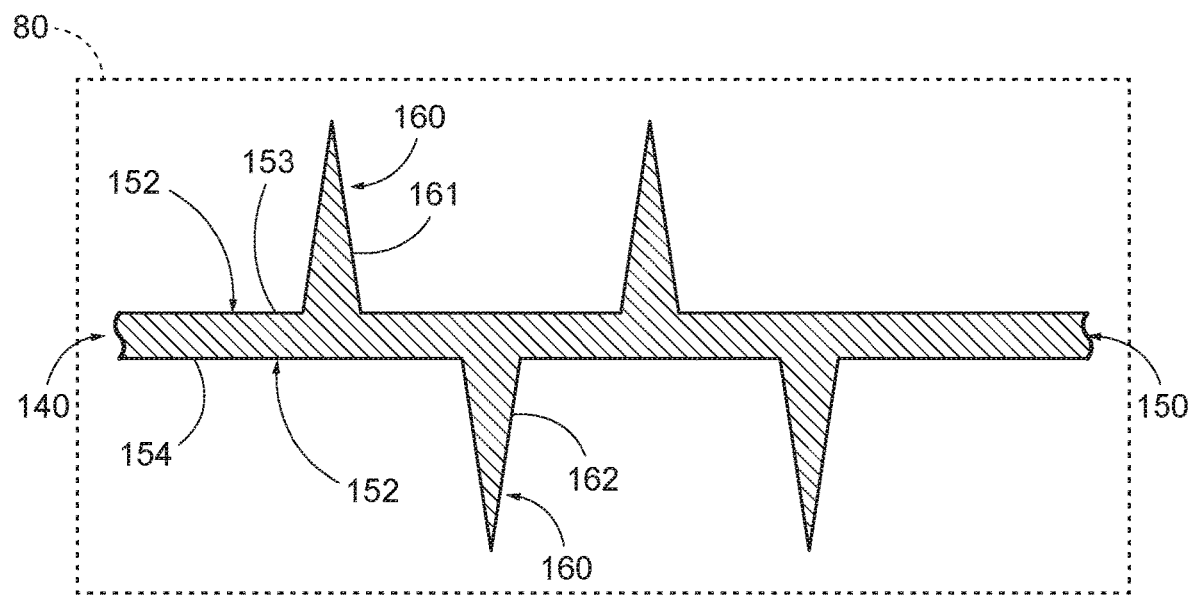
FIG. 7 is an illustration of examples of a portion of the method of FIG. 6.

Heating the joining structure at 210 may include heating any suitable joining structure in any suitable manner. The joining structure includes a base and a plurality of reinforcing projections that projects from the base. Examples of the joining structure are illustrated in FIGS. 2-5 and indicated at 140. An example of the heating at 210 is illustrated in FIG. 7. In the example of FIG. 7, a heating assembly 80 may be utilized to heat a joining structure 140. This may include heating a base 150 and/or reinforcing projections 160 of joining structure 140. Heating assembly 80, when utilized, may be separated and/or distinct from both joining structure 140 and from the thermoplastic assembly. Stated another way, the joining structure and/or the thermoplastic assembly may not include, may not be operatively attached to, and/or may not be in physical and/or thermal contact with the heating assembly, at least subsequent to the heating at 210. Examples of heating assembly 80 include an oven, an inductive heater, a radiant heater, a convective heater, and/or a source of electromagnetic radiation.

The heating at 210 may be accomplished in any suitable manner. As examples, the heating at 210 may include electrically heating the joining structure, inductively heating the joining structure, conductively heating the joining structure, convectively heating the joining structure, and/or radiatively heating the joining structure.

The heating at 210 may include storing at least a threshold quantity of thermal energy within the joining structure. The threshold quantity of thermal energy may be sufficient to facilitate the pressing at 220, which is discussed in more detail herein. With this in mind, methods 200 may include ceasing the heating at 210 prior to the pressing at 220. Stated another way, the heating at 210 may be sufficient to permit the pressing at 220 without, or without a need for, supplemental heating of the thermoplastic layer, with the heating assembly and/or with another structure that is distinct from the joining structure, during the pressing at 220. Stated yet another way, and during the pressing at 220, the thermoplastic layer may be heated solely by thermal transfer from the joining structure to the thermoplastic layer. However, this is not required of all embodiments, and it is within the scope of the present disclosure that methods 200 may include performing the heating at 210 at least partially, or even completely, concurrently with the pressing at 220.

The pressing at 220 may include establishing direct physical contact between the base and the thermoplastic layer. This may include applying a pressing force that urges the base and the thermoplastic layer toward one another. As an example, the pressing force may applied to the thermoplastic layer and directed toward the base and/or toward the joining structure. Additionally or alternatively, the pressing force may be applied to the base and/or to the joining structure and may be directed toward the thermoplastic layer.

The pressing at 220 may include transferring thermal energy from the joining structure to the thermoplastic layer, as indicated in FIG. 6 at 212. The pressing at 220 also may include penetrating the thermoplastic layer with the plurality of reinforcing projections, as indicated at 214. The pressing at 220 further may include adhering the thermoplastic layer to the joining structure, as indicated at 216.

Figure 8:
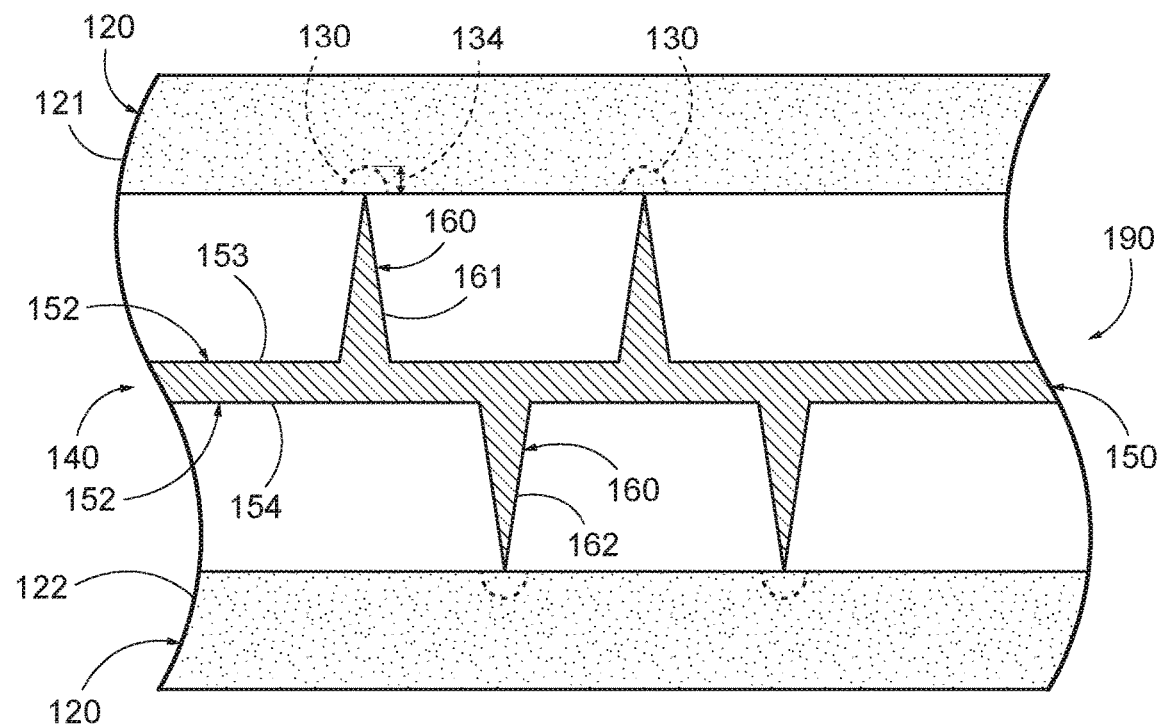
FIG. 8 is an illustration of examples of a portion of the method of FIG. 6.

The transferring, at 212, may include establishing direct physical contact between the joining structure and the thermoplastic layer and is illustrated in FIG. 8. As illustrated therein, reinforcing projections 160 of joining structure 140 are in direct physical contact with thermoplastic layer 120, thereby permitting and/or facilitating the transferring at 212. The transferring at 212 may include heating the thermoplastic layer, establishing a melt region of the thermoplastic layer, melting the melt region of the thermoplastic layer, and/or decreasing a viscosity of the melt region of the thermoplastic layer. Stated another way, the melt region may be formed, defined, and/or established responsive to the transferring at 212. Additionally or alternatively, the transferring at 212 may include directly heating a bondline that extends between the joining structure and the thermoplastic layer.

As discussed, the heating at 210 may include storing the threshold quantity of thermal energy within the joining structure, with the threshold quantity of thermal energy being sufficient to permit and/or facilitate the pressing at 220 without additional and/or supplemental heating of the thermoplastic layer and/or of the joining structure. With this in mind, the transferring at 212 may include transferring thermal energy to the thermoplastic layer only with the joining structure and/or only transferring the thermal energy that was stored within the joining structure, during the heating at 210, to the thermoplastic layer.

It is within the scope of the present disclosure that the transferring at 212 may include melting less than a threshold distance from the joining structure and into the thermoplastic layer. Stated another way, the transferring at 212 may include localized heating and/or melting of the thermoplastic layer only within a region of the thermoplastic layer that is less than the threshold distance from the joining structure. Stated yet another way, the transferring at 212 may not include melting an entirety of the thermoplastic layer. Examples of the threshold distance include distances of at most 0.5 millimeters (mm), at most 1.0 mm, at most 1.5 mm, at most 2.0 mm, at most 2.5 mm, at most 3.0 mm, at most 4.0 mm, at most 5.0 mm, at most 7.5 mm, at most 10 mm, at least 0.1 mm, at least 0.25 mm, at least 0.5 mm, at least 0.75 mm, at least 1.0 mm, at least 1.5 mm, and at least 2.0 mm. Additional examples of the threshold distance are illustrated in FIGS. 8-10 at 134.

Penetrating, at 214, the thermoplastic layer with the plurality of reinforcing projections may include penetrating such that the plurality of reinforcing projections extends into the thermoplastic layer. Stated another way, the penetrating at 214 may include extending the plurality of reinforcing projections into the thermoplastic layer to permit and/or to facilitate contact, direct contact, and/or direct physical contact between the base and the thermoplastic layer.

Figure 9:
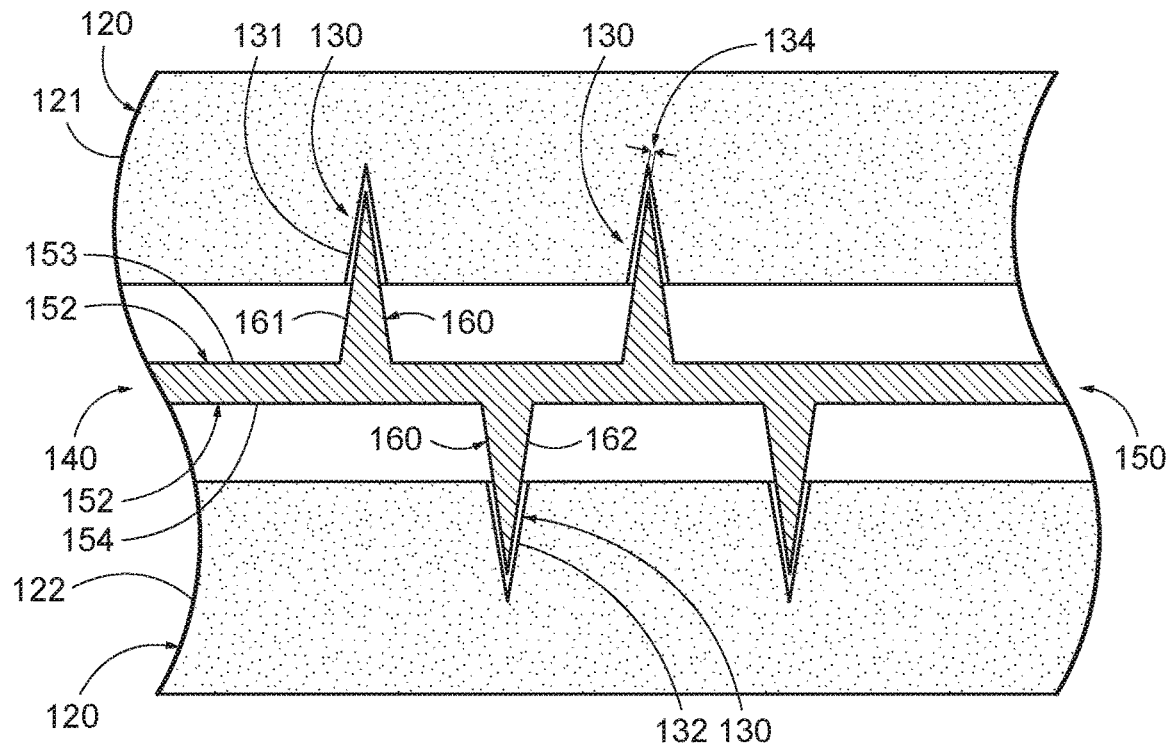
FIG. 9 is an illustration of examples of a portion of the method of FIG. 6.
Figure 10:
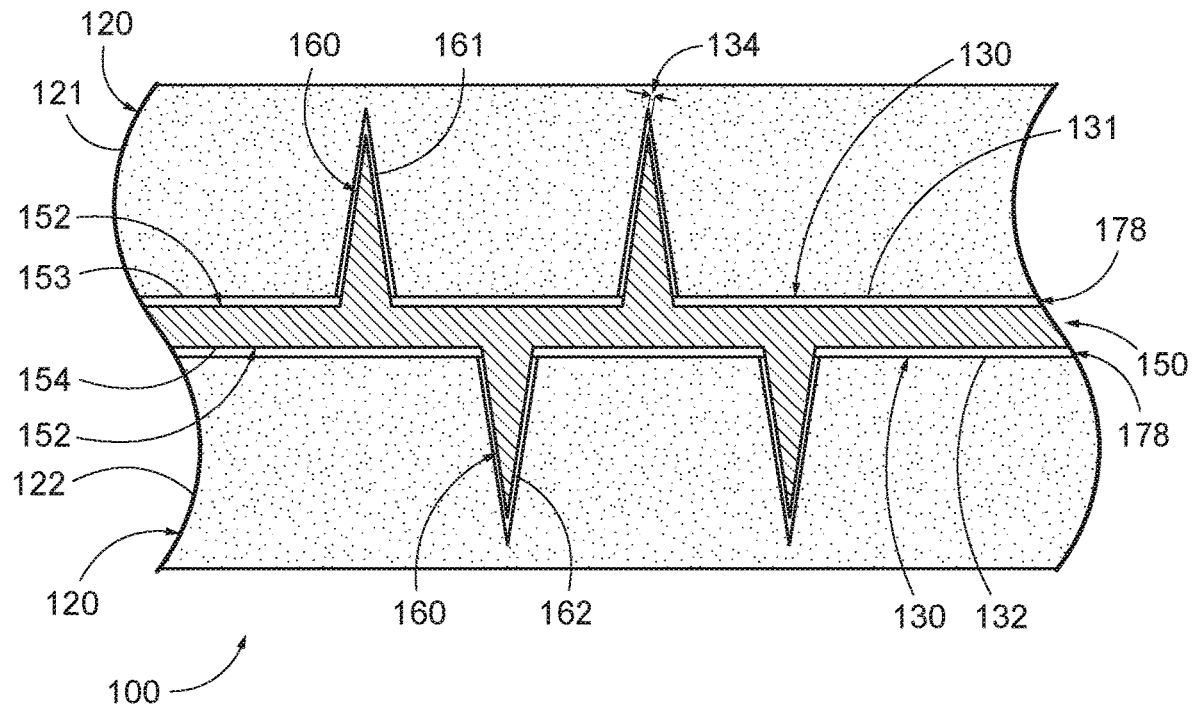
FIG. 10 is an illustration of examples of a portion of the method of FIG. 6.

The penetrating at 214 may be responsive to the pressing at 220 and/or to the transferring at 212 and is illustrated by the successive transition from FIG. 8 to FIG. 9 to FIG. 10. As illustrated in FIG. 8, melt region 130 initially may be established proximate tips of reinforcing projections 160 and/or proximate points-of-contact between thermoplastic layer 120 and joining structure 140.

Establishing the melt region may improve, or increase, thermal conduction between the joining structure and the thermoplastic layer and thus may facilitate additional thermal energy transfer from the joining structure to the thermoplastic layer. This may permit reinforcing projections 160 to extend into and/or to penetrate thermoplastic layer 120, as illustrated in FIG. 9. This process continues until thermoplastic layer 120 is in contact, in physical contact, and/or in direct physical contact with base 150, until thermoplastic layer 120 is in contact, in physical contact, and/or in direct physical contact with reinforcing projections 160 of joining structure 140, and/or until melt region 130 extends between, or between an entirety of, an interface region 178 between the joining structure and the thermoplastic layer, as illustrated in FIG. 10.

Adhering, at 216, the thermoplastic layer to the joining structure may include adhering the thermoplastic layer to a surface of the base of the joining structure and also to a surface, to a plurality of surfaces, to each surface, and/or to every surface of the plurality of reinforcing projections of the joining structure. The adhering at 216 may include adhering with, via, and/or utilizing the melt region of the thermoplastic layer. More specifically, and subsequent to the penetrating at 214, the adhering at 216 further may include cooling the thermoplastic layer and the joining structure to solidify the melt region and/or to define the thermoplastic assembly. Stated another way, the adhering at 216 may include melting the melt region of the thermoplastic layer against the joining structure and subsequently solidifying the melt region, such as to establish an adhesive bond between the thermoplastic layer and the joining structure.

As discussed herein with reference to FIG. 2, thermoplastic assemblies 100, according to the present disclosure, may include a single thermoplastic layer 120 and a joining structure 140 and/or may include a plurality of thermoplastic layers 120 joined together by joining structure 140. With this in mind, and as illustrated by FIGS. 8-10, the pressing at 220 may include pressing a first thermoplastic layer 121 against a first surface 153 of base 150 and also, or concurrently, pressing a second thermoplastic layer 122 against a second surface 154 of the base. Under these conditions, the transferring at 212 may include transferring, or concurrently transferring, thermal energy from joining structure 140 to both first thermoplastic layer 121 and second thermoplastic layer 122.

Similarly, the penetrating at 214 may include penetrating first thermoplastic layer 121 with a first plurality of reinforcing projections 161 of joining structure 140 and also penetrating, or concurrently penetrating, second thermoplastic layer 122 with a second plurality of reinforcing projections 162 of the joining structure. In addition, the adhering at 216 may include adhering first thermoplastic layer 121 to first surface 153 of base 150 and adhering, or concurrently adhering, the first thermoplastic layer to a surface of first plurality of reinforcing projections 161 with a first melt region 131. The adhering at 216 also may include adhering, or concurrently adhering, second thermoplastic layer 122 to second surface 154 of base 150 and adhering, or concurrently adhering, the second thermoplastic layer to a surface of second plurality of reinforcing projections 162 with a second melt region 132.

FIGS. 8-10 illustrate formation of a lap joint 190 between first thermoplastic layer 121 and second thermoplastic layer 122. Under these conditions, and as illustrated, first thermoplastic layer 121 and second thermoplastic layer 122 are positioned on opposed sides of joining structure 140. In addition, and as also illustrated, first surface 153 of base 150 and second surface 154 of the base may face away from one another and/or may be on opposed sides of joining structure 140.

As discussed herein with reference to FIG. 2, methods 200 additionally or alternatively may be utilized to form a butt joint 192 between first thermoplastic layer 121 and second thermoplastic layer 122. Under these conditions, and as illustrated in FIG. 2, first thermoplastic layer 121 and second thermoplastic layer 122 are positioned on the same side of joining structure 140. In addition, and also illustrated, first surface 153 of base 150 and second surface 154 of the base may face in the same direction and/or may be on the same side of joining structure 140.

Figure 11:
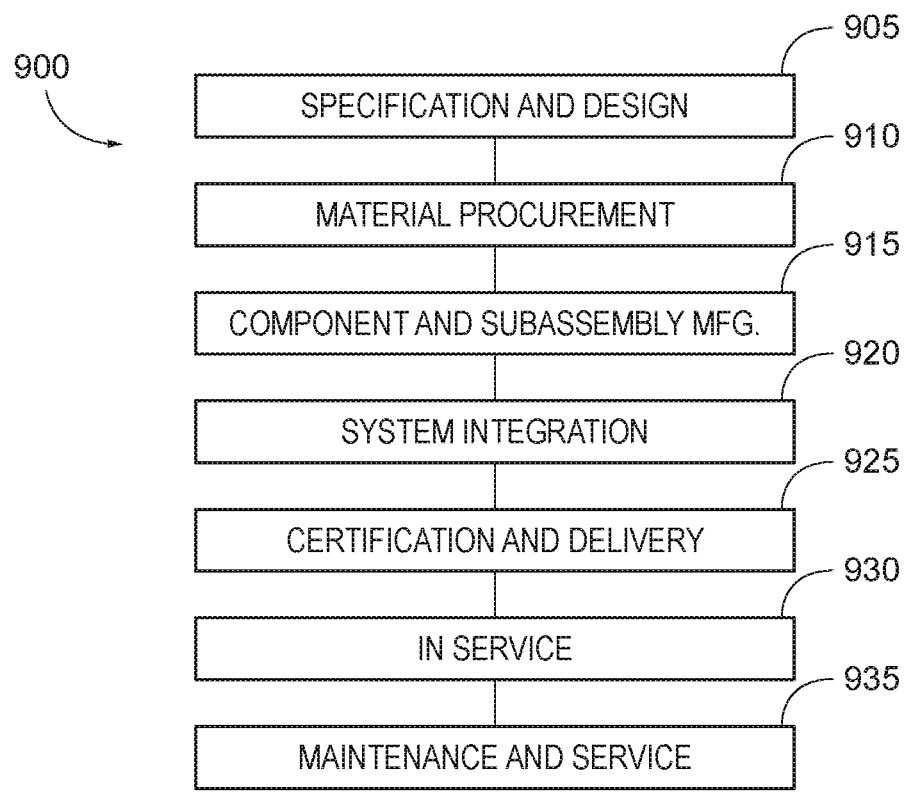
FIG. 11 is a flow diagram of aircraft production and service methodology.
Figure 12:
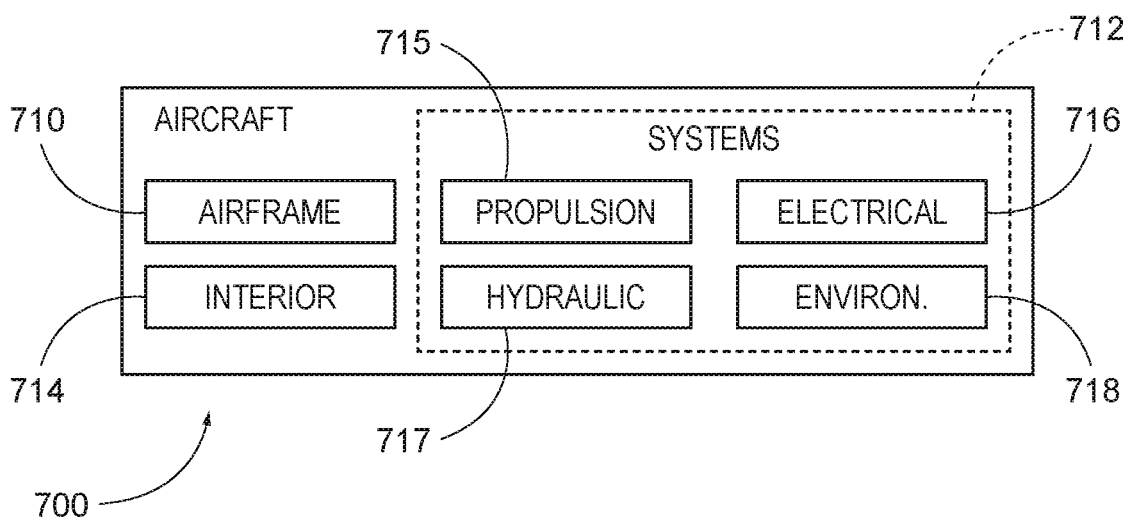
FIG. 12 is a block diagram of an aircraft.

Referring now to FIGS. 11-12, embodiments of the disclosure may be described in the context of an aircraft manufacturing and service method 900, as shown in FIG. 11, and an aircraft 700, as shown in FIG. 12. During pre-production, exemplary method 900 may include specification and design 905 of the aircraft 700 and material procurement 910. During production, component and subassembly manufacturing process 915 and system integration 920 of the aircraft 700 takes place. Thereafter, the aircraft 700 may go through certification and delivery 925 in order to be placed in service 930. While in service by a customer, the aircraft 700 is scheduled for routine maintenance and service 935 (which also may include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 12, the aircraft 700 produced by exemplary method 900 may include an airframe 710 with a plurality of systems 712 and an interior 714. Examples of high-level systems 712 include one or more of a propulsion system 715, an electrical system 716, a hydraulic system 717, and an environmental system 718. Any number of other systems may be included. Although an aerospace example is shown, the principles of the invention may be applied to other industries, such as the automotive industry.

Apparatus and methods embodied herein may be employed during any one or more of the stages of the manufacturing and service method 900. For example, components or subassemblies corresponding to component and subassembly manufacturing process 915 may be fabricated or manufactured in a manner similar to components or subassemblies produced while the aircraft 700 is in service. Also, one or more apparatus embodiments, method embodiments, or a combination thereof may be utilized during the production stages 915 and 920, for example, by substantially expediting assembly of or reducing the cost of an aircraft 700. Similarly, one or more of apparatus embodiments, method embodiments, or a combination thereof may be utilized while the aircraft 700 is in service, for example and without limitation, to maintenance and service 935.

Illustrative, non-exclusive examples of inventive subject matter according to the present disclosure are described in the following enumerated paragraphs:

A1. A thermoplastic assembly, comprising:
a thermoplastic layer; and
a joining structure, wherein the joining structure includes:
(i) a base; and
(ii) a plurality of reinforcing projections that projects from the base;
and further wherein:
(i) the plurality of reinforcing projections extends into the thermoplastic layer;
(ii) the thermoplastic layer is in direct physical contact with the base; and (iii) a melt region of the thermoplastic layer adheres the thermoplastic layer to a surface of the base and also to a surface, and optionally to every surface, of the plurality of reinforcing projections.

A2. The thermoplastic assembly of paragraph A1, wherein the joining structure is a monolithic, or unitary, joining structure that defines both the base and the plurality of reinforcing projections.

A3. The thermoplastic assembly of any of paragraphs A1-A2, wherein the plurality of reinforcing projections is shaped to resist deformation during formation of the thermoplastic assembly.

A4. The thermoplastic assembly of any of paragraphs A1-A3, wherein the joining structure is an electrically conductive joining structure.

A5. The thermoplastic assembly of any of paragraphs A1-A4, wherein the joining structure is formed from a joining structure material with a joining structure thermal conductivity of at least one of at least 10 Watts/meter-Kelvin (W/m-K), at least 20 W/m-K, at least 30 W/m-K, at least 40 W/m-K, at least 50 W/m-K, at least 60 W/m-K, at least 80 W/m-K, at least 100 W/m-K, at least 125 W/m-K, at least 150 W/m-K, at least 175 W/m-K, at least 200 W/m-K, at least 250 W/m-K, at least 300 W/m-K, at most 10 W/m-K, at most 20 W/m-K, at most 30 W/m-K, at most 40 W/m-K, at most 50 W/m-K, at most 60 W/m-K, at most 80 W/m-K, at most 100 W/m-K, at most 125 W/m-K, at most 150 W/m-K, at most 175 W/m-K, at most 200 W/m-K, at most 250 W/m-K, and at most 300 W/m-K.

A6. The thermoplastic assembly of any of paragraphs A1-A5, wherein the joining structure is formed from a/the joining structure material with a joining structure heat capacity of at least one of at least 100 Joules/kilogram-Kelvin (J/kg-K), at least 150 J/kg-K, at least 200 J/kg-K, at least 250 J/kg-K, at least 300 J/kg-K, at least 350 J/kg-K, at least 400 J/kg-K, at least 450 J/kg-K, at least 500 J/kg-K, at least 600 J/kg-K, at least 700 J/kg-K, at least 800 J/kg-K, at least 900 J/kg-K, at most 100 J/kg-K, at most 150 J/kg-K, at most 200 J/kg-K, at most 250 J/kg-K, at most 300 J/kg-K, at most 350 J/kg-K, at most 400 J/kg-K, at most 450 J/kg-K, at most 500 J/kg-K, at most 600 J/kg-K, at most 700 J/kg-K, at most 800 J/kg-K, and at most 900 J/kg-K.

A7. The thermoplastic assembly of any of paragraphs A1-A6, wherein the joining structure is at least substantially non-reactive with the thermoplastic layer.

A8. The thermoplastic assembly of any of paragraphs A1-A7, wherein the joining material is approved for contact with the thermoplastic layer.

A9. The thermoplastic assembly of any of paragraphs A1-A8, wherein each reinforcing projection in the plurality of reinforcing projections at least one of:
(i) is pointed;
(ii) is flat;
(iii) is triangle-shaped;
(iv) is arrow-shaped;
(v) is pin-shaped;
(vi) is rod-shaped;
(vii) is teardrop-shaped; and
(viii) is barbed.

A10. The thermoplastic assembly of any of paragraphs A1-A9, wherein each reinforcing projection in the plurality of reinforcing projections projects perpendicular, or at least substantially perpendicular, from a respective adjacent region of the base.

A11. The thermoplastic assembly of any of paragraphs A1-A10, wherein each reinforcing projection in the plurality of reinforcing projections defines a corresponding separation-resisting region configured to resist separation of the thermoplastic layer from the joining structure.

A12. The thermoplastic assembly of paragraph A11, wherein the corresponding separation-resisting region includes a corresponding separation-resisting projection that projects from a remainder of each reinforcing projection.

A13. The thermoplastic assembly of paragraph A12, wherein the corresponding separation-resisting projection extends parallel, or at least substantially parallel, to a/the respective adjacent region of the base from which each reinforcing projection extends.

A14. The thermoplastic assembly of any of paragraphs A1-A13, wherein the joining structure is defined by a sheet of joining material, wherein the sheet of joining material includes a plurality of projection profiles defined therein, and further wherein the plurality of reinforcing projections at least partially bounds the plurality of projection profiles and extends out-of-plane with a remainder of the sheet of joining material.

A15. The thermoplastic assembly of paragraph A14, wherein the joining structure further includes a plurality of holes, wherein each hole in the plurality of holes is associated with a corresponding reinforcing projection in the plurality of reinforcing projections.

A16. The thermoplastic assembly of any of paragraphs A1-A15, wherein a/the sheet of joining material defines the base, and further wherein the plurality of reinforcing projections is defined by at least one of:
(i) cutting a/the sheet of joining material;
(ii) laser cutting the sheet of joining material;
(iii) etching the sheet of joining material;
(iv) laser etching the sheet of joining material;
(v) stamping the sheet of joining material; and
(vi) die-cutting the sheet of joining material.

A17. The thermoplastic assembly of any of paragraphs A1-A16, wherein the thermoplastic layer includes, and optionally is, a thermoplastic resin.

A18. The thermoplastic assembly of any of paragraphs A1-A17, wherein the thermoplastic layer includes, and optionally is, a thermoplastic resin with a plurality of reinforcing fibers.

A19. The thermoplastic assembly of paragraph A18, wherein the plurality of reinforcing fibers includes at least one of:
(i) a plurality of glass reinforcing fibers; and
(ii) a plurality of carbon reinforcing fibers.

A20. The thermoplastic assembly of any of paragraphs A1-A19, wherein the thermoplastic layer includes, and optionally is, at least one of:
(i) an acrylic;
(ii) a poly methyl methacrylate (PMMA) polymer;
(iii) an acrylonitrile butadiene styrene (ABS) polymer;
(iv) a nylon;
(v) a polyamide;
(vi) a polylactic acid polymer;
(vii) a polybenzimidazole (PB) polymer;
(viii) a polycarbonate (PC);
(ix) a polyether sulfone (PES) polymer;
(x) a polyoxymethylene (POM) polymer;
(xi) a polyetherether ketone (PEEK) polymer;
(xii) a polyetherimide (PEI) polymer;
(xiii) a polyethylene (PE) polymer;
(xiv) a polyphenylene oxide (PPO) polymer;
(xv) a polyphynylene sulfide (PPS) polymer;
(xvi) a polypropylene (PP) polymer;
(xvii) a polystyrene polymer;
(xviii) a polyvinyl chloride (PVC) polymer; and (ixx) a polytetrafluoroethylene (PTFE) polymer.

A21. The thermoplastic assembly of any of paragraphs A1-A20, wherein the thermoplastic layer is an electrically insulating thermoplastic layer.

A22. The thermoplastic assembly of any of paragraphs A1-A21, wherein the thermoplastic layer is formed from a thermoplastic material with a thermoplastic material thermal conductivity of at least one of at least 10 W/m-K, at least 8 W/m-K, at least 6 W/m-K, at least 5 W/m-K, at least 4 W/m-K, at least 3 W/m-K, at least 2 W/m-K, at least 1 W/m-K, at least 0.8 W/m-K, at least 0.6 W/m-K, at least 0.4 W/m-K, at least 0.2 W/m-K, at least 0.1 W/m-K, at most 10 W/m-K, at most 8 W/m-K, at most 6 W/m-K, at most 5 W/m-K, at most 4 W/m-K, at most 3 W/m-K, at most 2 W/m-K, at most 1 W/m-K, at most 0.8 W/m-K, at most 0.6 W/m-K, at most 0.4 W/m-K, at most 0.2 W/m-K, and at most 0.1 W/m-K.

A23. The thermoplastic assembly of any of paragraphs A1-A22, wherein the thermoplastic layer is formed from a/the thermoplastic material with a thermoplastic material heat capacity of at least one of at least 500 J/kg-K, at least 600 J/kg-K, at least 700 J/kg-K, at least 800 J/kg-K, at least 900 J/kg-K, at least 1000 J/kg-K, at least 1200 J/kg-K, at least 1400 J/kg-K, at least 1600 J/kg-K, at least 1800 J/kg-K, at least 2000 J/kg-K, at most 500 J/kg-K, at most 600 J/kg-K, at most 700 J/kg-K, at most 800 J/kg-K, at most 900 J/kg-K, at most 1000 J/kg-K, at most 1200 J/kg-K, at most 1400 J/kg-K, at most 1600 J/kg-K, at most 1800 J/kg-K, and at most 2000 J/kg-K.

A24. The thermoplastic assembly of any of paragraphs A1-A23, wherein a/the joining structure thermal conductivity of the joining structure is greater than a/the thermoplastic material thermal conductivity of the thermoplastic material.

A25. The thermoplastic assembly of any of paragraphs A1-A24, wherein a ratio of a/the joining structure thermal conductivity of the joining structure to a/the thermoplastic material thermal conductivity of the thermoplastic material is at least one of at least 2, at least 4, at least 6, at least 8, at least 10, at least 15, at least 20, at least 30, at least 40, at least 50, at least 75, at least 100, at least 250, at least 500, or at least 1000.

A26. The thermoplastic assembly of any of paragraphs A1-A25, wherein the plurality of reinforcing projections defines an average projection length that the plurality of reinforcing projections projects from the base.

A27. The thermoplastic assembly of paragraph A26, wherein the thermoplastic layer defines an average thermoplastic layer thickness as defined in a direction that is perpendicular to the surface of the base.

A28. The thermoplastic assembly of paragraph A27, wherein the average projection length is less than the average thermoplastic layer thickness.

A29. The thermoplastic assembly of paragraph A27, wherein the average projection length is greater than the average thermoplastic layer thickness.

A30. The thermoplastic assembly of paragraph A29, wherein the plurality of reinforcing projections extends from the thermoplastic layer.

A31. The thermoplastic assembly of any of paragraphs A29-A30, wherein a portion of the plurality of reinforcing projections that extends from the thermoplastic layer is bent against an outer surface of the thermoplastic layer.

A32. The thermoplastic assembly of any of paragraphs A27-A31, wherein a ratio of the average projection length to the average thermoplastic layer thickness is at least one of at least 0.1, at least 0.2, at least 0.3, at least 0.4, at least 0.5, at least 0.6, at least 0.7, at least 0.8, at least 0.9, at least 1.0, at least 1.1, at least 1.2, at least 1.4, at most 2.0, at most 1.8, at most 1.6, at most 1.4, at most 1.2, at most 1.0, at most 0.9, at most 0.8, at most 0.7, at most 0.6, at most 0.5, at most 0.4, at most 0.3, and at most 0.2.

A33. The thermoplastic assembly of any of paragraphs A26-A32, wherein the thermoplastic layer includes a plurality of plies of thermoplastic material, wherein the plurality of plies of thermoplastic material defines an average ply thickness, and further wherein a ratio of the average projection length to the average ply thickness is at least one of at least 1, at least 2, at least 3, at least 4, at least 5, at least 6, at least 8, at least 10, at most 50, at most 40, at most 30, at most 25, at most 20, at most 15, and at most 10.

A34. The thermoplastic assembly of any of paragraphs A1-A33, wherein:

(i) the thermoplastic layer is a first thermoplastic layer and the thermoplastic assembly further includes a second thermoplastic layer;

(ii) the surface of the base is a first surface of the base defined within a first region of the base and the joining structure further includes a second surface of the base defined within a second region of the base;

(iii) the plurality of reinforcing projections is a first plurality of reinforcing projections that projects from the first surface of the base and the joining structure includes a second plurality of reinforcing projections that projects from the second surface of the base;

(iv) the second plurality of reinforcing projections extends into the second thermoplastic layer;

(v) the second thermoplastic layer is in direct physical contact with the second surface of the base; and (vi) the melt region is a first melt region and the second thermoplastic layer includes a second melt region that adheres the second thermoplastic layer to the second surface of the base and also to a surface of the second plurality of reinforcing projections.

A35. The thermoplastic assembly of paragraph A34, wherein the thermoplastic assembly defines a lap joint between the first thermoplastic layer and the second thermoplastic layer.

A36. The thermoplastic assembly of any of paragraphs A34-A35, wherein the thermoplastic assembly defines a butt joint between the first thermoplastic layer and the second thermoplastic layer.

A37. The thermoplastic assembly of any of paragraphs A34-A36, wherein the first surface of the base faces away from, or is opposite, the second surface of the base.

A38. The thermoplastic assembly of any of paragraphs A34-A37, wherein the first surface of the base and the second surface of the base are on opposed sides of the joining structure.

A39. The thermoplastic assembly of any of paragraphs A34-A38, wherein the first surface of the base and the second surface of the base are on the same side of the joining structure.

A40. An aircraft including the thermoplastic assembly of any of paragraphs A1-A39.

B1. A method of adhering a thermoplastic layer to a joining structure to define a thermoplastic assembly, the method comprising:

heating the joining structure, wherein the joining structure defines a base and includes a plurality of reinforcing projections that projects from the base; and pressing the thermoplastic layer against the base of the joining structure, wherein the pressing includes:

(i) transferring thermal energy from the joining structure to the thermoplastic layer;

(ii) penetrating the thermoplastic layer with the plurality of reinforcing projections such that the plurality of reinforcing projections extends into the thermoplastic layer; and (iii) adhering the thermoplastic layer to a surface of the base and to a surface of the plurality of reinforcing projections with a melt region of the thermoplastic layer, wherein the melt region is formed responsive to the transferring, and further wherein the adhering includes cooling the thermoplastic layer and the joining structure to solidify the melt region and define the thermoplastic assembly.

B2. The method of paragraph B1, wherein the heating the joining structure includes at least one of:

(i) electrically heating the joining structure;
(ii) inductively heating the joining structure;
(iii) conductively heating the joining structure;
(iv) convectively heating the joining structure; and
(v) radiatively heating the joining structure.

B3. The method of any of paragraphs B1-B2, wherein the method includes ceasing the heating the joining structure prior to the pressing the thermoplastic layer against the base.

B3.1 The method of any of paragraphs B1-B2, wherein the method includes heating the joining structure at least partially concurrently, and optionally completely concurrently, with the pressing the thermoplastic layer against the base.

B4. The method of any of paragraphs B1-B3, wherein the heating the joining structure includes heating the joining structure with a heating assembly that is distinct from both the joining structure and the thermoplastic assembly.

B5. The method of any of paragraphs B1-B4, wherein the heating the joining structure includes heating the joining structure with a/the heating assembly, and further wherein the thermoplastic assembly does not include the heating assembly.

B6. The method of any of paragraphs B1-B5, wherein the heating the joining structure includes storing at least a threshold quantity of thermal energy within the joining structure, wherein the threshold quantity of thermal energy is sufficient to facilitate the pressing the thermoplastic layer against the base.

B7. The method of any of paragraphs B1-B6, wherein the pressing includes establishing direct physical contact between the base and the thermoplastic layer.

B8. The method of any of paragraphs B1-B7, wherein the transferring thermal energy includes at least one of:

(i) heating the thermoplastic layer;
(ii) melting the melt region of the thermoplastic layer; and
(iii) decreasing a viscosity of the melt region of the thermoplastic layer.

B9. The method of any of paragraphs B1-B8, wherein the transferring thermal energy includes directly heating a bond-line between the joining structure and the thermoplastic layer.

B10. The method of any of paragraphs B1-B9, wherein the transferring thermal energy includes melting less than a threshold distance from the joining structure and into the thermoplastic layer.

B11. The method of paragraph B10, wherein the threshold distance is at least one of at most 0.5 millimeters (mm), at most 1.0 mm, at most 1.5 mm, at most 2.0 mm, at most 2.5 mm, at most 3.0 mm, at most 4.0 mm, at most 5.0 mm, at most 7.5 mm, at most 10 mm, at least 0.1 mm, at least 0.25 mm, at least 0.5 mm, at least 0.75 mm, at least 1.0 mm, at least 1.5 mm, and at least 2.0 mm.

B12. The method of any of paragraphs B1-B11, wherein the pressing includes extending the plurality of reinforcing projections into the thermoplastic layer to permit direct physical contact between the base and the thermoplastic layer.

B13. The method of any of paragraphs B1-B12, wherein the adhering includes establishing an adhesive bond between the thermoplastic layer and the joining structure.

B14. The method of any of paragraphs B1-B13, wherein the adhering includes melting the melt region of the thermoplastic layer against the joining structure and subsequently solidifying the melt region.

B15. The method of any of paragraphs B1-B14, wherein:

(i) the thermoplastic layer is a first thermoplastic layer and the thermoplastic assembly further includes a second thermoplastic layer;
(ii) the surface of the base is a first surface of the base defined within a first region of the base and the joining structure further includes a second surface of the base defined within a second region of the base;
(iii) the plurality of reinforcing projections is a first plurality of reinforcing projections that projects from the first surface of the base and the joining structure includes a second plurality of reinforcing projections that projects from the second surface of the base;
(iv) optionally the second plurality of reinforcing projections extends into the second thermoplastic layer;
(v) optionally the second thermoplastic layer is in direct physical contact with the second surface of the base; and
(vi) optionally the melt region is a first melt region and the second thermoplastic layer includes a second melt region that adheres the second thermoplastic layer to the second surface of the base and also to a surface of the second plurality of reinforcing projections.

B16. The method of paragraph B15, wherein (i) the pressing includes pressing the first thermoplastic layer against the first surface of the base and concurrently pressing the second thermoplastic layer against the second surface of the base;
(ii) the transferring includes transferring, or concurrently transferring, thermal energy from the joining structure to both the first thermoplastic layer and the second thermoplastic layer;
(iii) the penetrating includes penetrating the first thermoplastic layer with the first plurality of reinforcing projections and penetrating, or concurrently penetrating, the second thermoplastic layer with the second plurality of reinforcing projections;
(iv) the adhering includes adhering the first thermoplastic layer to the first surface of the base and to a surface of the first plurality of reinforcing projections with the first melt region and also adhering, or concurrently adhering, the second thermoplastic layer to the second surface of the base and to a surface of the second plurality of reinforcing projections with the second melt region.

B17. The method of any of paragraphs B15-B16, wherein one of:

(i) the first surface of the base faces away from the second surface of the base; and
(ii) the first surface of the base and the second surface of the base face in the same, or in at least substantially the same, direction.

B18. The method of any of paragraphs B15-B17, wherein the method includes at least one of:

(i) defining a lap joint between the first thermoplastic layer and the second thermoplastic layer; and
(ii) defining a butt joint between the first thermoplastic layer and the second thermoplastic layer.

B19. The method of any of paragraphs B15-B18, wherein the first thermoplastic layer includes, or is, a first component of an aircraft, wherein the second thermoplastic layer includes, or is, a second component of the aircraft, and further wherein the thermoplastic assembly includes, or is, a sub-assembly of the aircraft.

B20. The method of any of paragraphs B1-B19, wherein, during the pressing, the method includes transferring thermal energy to the thermoplastic layer only with the joining structure.

B21. The method of any of paragraphs B1-B20, wherein the method includes performing the method without supplemental heating of the thermoplastic layer.

B22. The method of any of paragraphs B1-B21, wherein the thermoplastic assembly includes, and optionally is, the thermoplastic assembly of any of paragraphs A1-A39.

B23. The method of any of paragraphs B1-B22, wherein the method further includes any suitable structure of any of the thermoplastic assemblies of any of paragraphs A1-A39.

C1. The use of a joining structure to heat a first thermoplastic layer and a second thermoplastic layer during joining of the first thermoplastic layer to the second thermoplastic layer and also to reinforce a joint between the first thermoplastic layer and the second thermoplastic layer in a thermoplastic assembly that includes the first thermoplastic layer, the second thermoplastic layer, and the joining structure.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A method of adhering a thermoplastic layer to a joining structure to define a thermoplastic assembly, the method comprising:
   heating the joining structure, wherein the joining structure defines a base and includes a plurality of reinforcing projections that projects from the base; and
   pressing the thermoplastic layer against the base of the joining structure, wherein the pressing includes:
   (i) transferring thermal energy from the joining structure to the thermoplastic layer;
   (ii) penetrating the thermoplastic layer with the plurality of reinforcing projections such that the plurality of reinforcing projections extends into the thermoplastic layer; and
   (iii) adhering the thermoplastic layer to a surface of the base and to a surface of the plurality of reinforcing projections with a melt region of the thermoplastic layer, wherein the melt region is formed responsive to the transferring, and further wherein the adhering includes cooling the thermoplastic layer and the joining structure to solidify the melt region and define the thermoplastic assembly;

wherein the method includes ceasing the heating the joining structure prior to the pressing the thermoplastic layer against the base.

2. The method of claim 1, wherein the heating the joining structure includes heating the joining structure with a heating assembly that is distinct from both the joining structure and the thermoplastic assembly.

3. The method of claim 1, wherein the heating the joining structure includes storing at least a threshold quantity of thermal energy within the joining structure, wherein the threshold quantity of thermal energy is sufficient to facilitate the pressing the thermoplastic layer against the base.

4. The method of claim 1, wherein the transferring thermal energy includes at least one of:
  (i) heating the thermoplastic layer;
  (ii) melting the melt region of the thermoplastic layer; and
  (iii) decreasing a viscosity of the melt region of the thermoplastic layer.

5. The method of claim 1, wherein the transferring thermal energy includes melting less than a threshold distance of at most 5 millimeters from the joining structure and into the thermoplastic layer.

6. The method of claim 1, wherein the adhering includes melting the melt region of the thermoplastic layer against the joining structure and subsequently solidifying the melt region.

7. The method of claim 1, wherein:
  (i) the thermoplastic layer is a first thermoplastic layer and the thermoplastic assembly further includes a second thermoplastic layer;
  (ii) the surface of the base is a first surface of the base defined within a first region of the base and the joining structure further includes a second surface of the base defined within a second region of the base; and
  (iii) the plurality of reinforcing projections is a first plurality of reinforcing projections that projects from the first surface of the base and the joining structure includes a second plurality of reinforcing projections that projects from the second surface of the base.

8. The method of claim 7, wherein
  (i) the pressing includes pressing the first thermoplastic layer against the first surface of the base and concurrently pressing the second thermoplastic layer against the second surface of the base;
  (ii) the transferring includes transferring thermal energy from the joining structure to both the first thermoplastic layer and the second thermoplastic layer;
  (iii) the penetrating includes penetrating the first thermoplastic layer with the first plurality of reinforcing projections and penetrating the second thermoplastic layer with the second plurality of reinforcing projections; and
  (iv) wherein the melt region is a first melt region, wherein the adhering includes adhering the first thermoplastic layer to the first surface of the base and to a surface of the first plurality of reinforcing projections with the first melt region and also adhering the second thermoplastic layer to the second surface of the base and to a surface of the second plurality of reinforcing projections with a second melt region.

9. The method of claim 7, wherein the first thermoplastic layer includes a first component of an aircraft, wherein the second thermoplastic layer includes a second component of the aircraft, and further wherein the thermoplastic assembly includes a sub-assembly of the aircraft.

10. The method of claim 1, wherein, during the pressing, the method includes transferring thermal energy to the thermoplastic layer only with the joining structure.

11. The method of claim 1, wherein, subsequent to the pressing, the thermoplastic layer is in direct physical contact with the base.

12. The method of claim 1, wherein each reinforcing projection in the plurality of reinforcing projections defines a corresponding separation-resisting region configured to resist separation of the thermoplastic layer from the joining structure, wherein the corresponding separation-resisting region includes a corresponding separation-resisting projection that projects from a remainder of each reinforcing projection.

13. The method of claim 1, wherein the joining structure is defined by a sheet of joining material, wherein the sheet of joining material includes a plurality of projection profiles defined therein, and further wherein the plurality of reinforcing projections at least partially bounds the plurality of projection profiles and extends out-of-plane with a remainder of the sheet of joining material.

14. The method of claim 1, wherein a joining structure thermal conductivity of the joining structure is greater than a thermoplastic material thermal conductivity of the thermoplastic layer.

15. The method of claim 7, wherein the thermoplastic assembly defines a lap joint between the first thermoplastic layer and the second thermoplastic layer.

16. The method of claim 7, wherein the thermoplastic assembly defines a butt joint between the first thermoplastic layer and the second thermoplastic layer.

* * * * *